(12) United States Patent
Zeller

(10) Patent No.: US 11,204,601 B2
(45) Date of Patent: Dec. 21, 2021

(54) MARKOV CHAINS AND COMPONENT FAULT TREES FOR MODELLING TECHNICAL SYSTEMS

(71) Applicant: SIEMENS AKTIENGESELLSCHAFT, Munich (DE)

(72) Inventor: Marc Zeller, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/572,612

(22) PCT Filed: Dec. 7, 2016

(86) PCT No.: PCT/EP2016/080134
§ 371 (c)(1),
(2) Date: Nov. 8, 2017

(87) PCT Pub. No.: WO2018/103842
PCT Pub. Date: Jun. 14, 2018

(65) Prior Publication Data
US 2020/0225652 A1    Jul. 16, 2020

(30) Foreign Application Priority Data

Dec. 6, 2016  (WO) ................. PCT/EP2016/079852

(51) Int. Cl.
*G05B 23/02* (2006.01)
*G06N 7/00* (2006.01)

(52) U.S. Cl.
CPC ..... *G05B 23/0248* (2013.01); *G05B 23/0254* (2013.01); *G06N 7/005* (2013.01); *G05B 2219/24076* (2013.01)

(58) Field of Classification Search
CPC ............ G05B 23/0254; G05B 23/0248; G05B 2219/24076; G06N 7/005; G06F 30/33; G06F 2111/20; G06F 2111/08
See application file for complete search history.

(56) References Cited

U.S. PATENT DOCUMENTS 7,426,554 B2 *  9/2008  Kennedy ............... H04L 41/069
                                                 709/223
8,346,694 B2 *  1/2013  Dugan .................. G06Q 40/08
                                                 706/45

(Continued)

FOREIGN PATENT DOCUMENTS

CN         106570342 A  *  4/2017

OTHER PUBLICATIONS

Boudali, H., et al. "Dynamic Fault Tree analysis using Input/Output Interactive Markov Chains" Int'l Conf. Dependable Sys. & Networks, DSN'07 (2007) (Year: 2007).*

(Continued)

*Primary Examiner* — Jay Hann
(74) *Attorney, Agent, or Firm* — Schmeiser, Olsen & Watts LLP

(57) ABSTRACT

A method for modelling technical systems having a plurality of technical components, including the step of assigning a component Markov chain to each component having a Markov chain for representing various states of the respective component, at least one input one failure mode for externally triggering a transition from one state of the Markov chain into another state of the Markov chain, and at least one output failure mode to each Markov chain for propagating failures to other components, is provided.

18 Claims, 4 Drawing Sheets

(56) References Cited

U.S. PATENT DOCUMENTS

Figure 1:
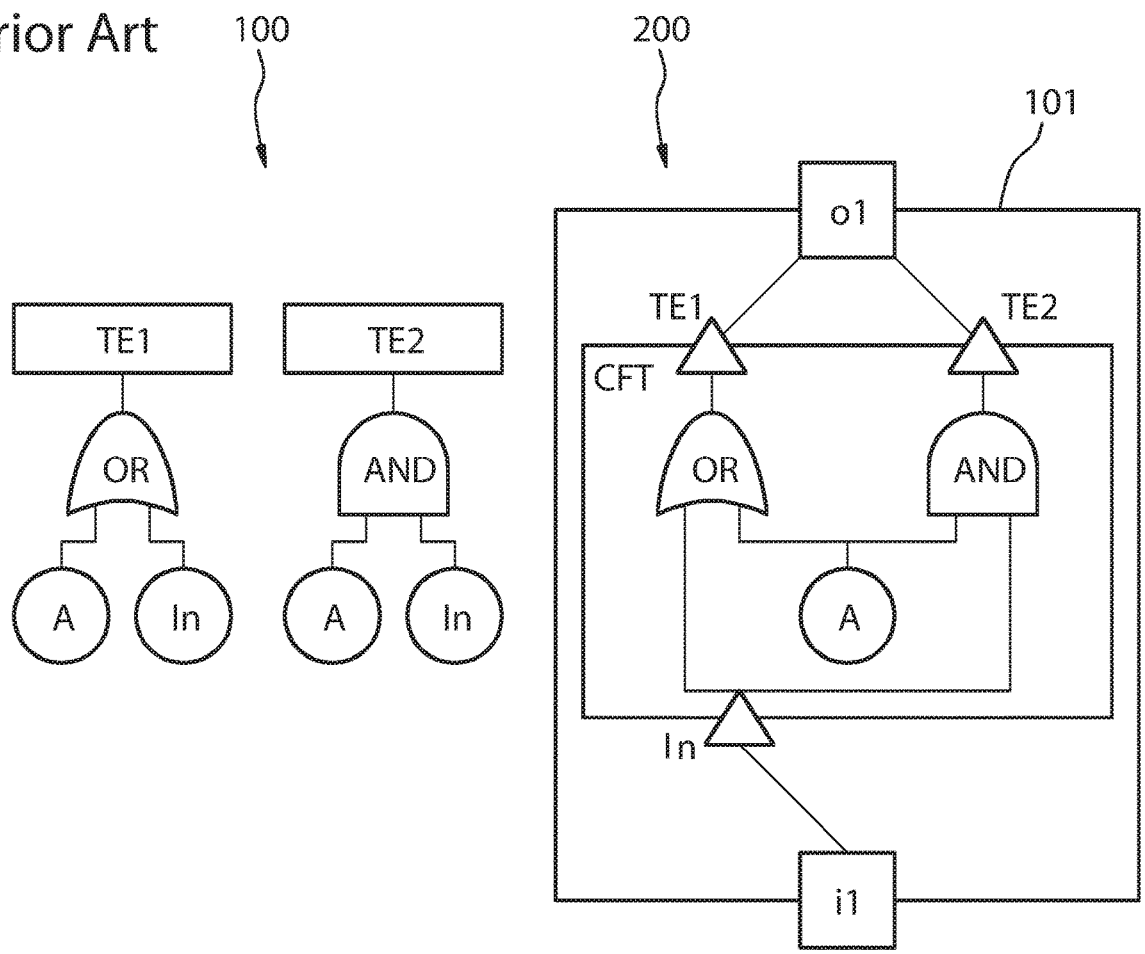

| | | | | |
|---|---|---|---|---|
| 8,762,321 | B2* | 6/2014 | Joanni | G06N 7/005 |
| | | | | 706/59 |
| 8,832,497 | B2* | 9/2014 | Bluvband | G05B 23/0248 |
| | | | | 714/26 |
| 9,430,315 | B2* | 8/2016 | He | G05B 23/0278 |
| 9,753,441 | B2* | 9/2017 | Huynh | G05B 23/0248 |
| 10,095,813 | B2* | 10/2018 | Ramesh | G05B 23/0248 |
| 2011/0137703 | A1* | 6/2011 | Dugan | G06Q 10/0635 |
| | | | | 705/7.28 |

OTHER PUBLICATIONS

Ruijters, E. & Stoelinga, M. "Fault Tree Analysis: A Survey of the State-of-the-Art in Modeling Analysis and Tools" Computer Science Review, pp. 29-62 (2015) (Year: 2015).*

Arnold, F., et al. "DFTCalc: A Tool for Efficient Fault Tree Analysis" Computer Safety Reliability & Security, SAFECOMP 2013, pp. 293-301 (2013) (Year: 2013).*

Kaiser, B., et al. "A New Component Concept for Fault Trees" 8th Australian Workshop on Safety Critical Systems & Software, SCS '03, pp. 37-46 (2003) (Year: 2003).*

Liggesmeyer, P. & Maeckel, O. "Quantifying the Reliability of Embedded Systems by Automated Analysis" IEEE Int'l Conf. on Dependable Systems & Networks (2001) available from <https://ieeexplore.ieee.org/abstract/document/941395> (Year: 2001).*

Jeong Kwang Sub et al: "Development of the dynamic fault tree using Markovian process and supercomponent", Reliability Engineering, pp. 137-160, XP055373858, DOI: 10.1016/0143-817 4(87)90108-9, retrieved on May 16, 2017 from the Internet: URL: www.sciencedirect.com/science/article/pii/0143817487901089; 1987.

Adler R et al: "Determining Configuration Probabilities of Safety-Critical Adaptive Systems", Advanced Information Networking and Applications Workshops, 2007, AINAW '07, 21st International Conference On, IEEE. Piscataway, NJ, USA, pp. 548-555, XP031334739, ISBN: 978-0-7695-2847-2; 2007.

Möhrle Felix et al: "Automating compositional safety analysis using a failure type taxonomy for Component Fault Trees", Risk, Reliability and Safety: Innovating Theory and Practice: Proceedings of ESREL 2016 (Glasgow, Scotland, Sep. 25-29, 2016), pp. 1380-1387, XP055373867, DOI: 10.1201 /9781315374987-207, ISBN: 978-1-138-02997-2, retrieved on May 17, 2017 from the Internet: URL:https://www.researchgate.net/profile/Felix_Moehrle/publication/308903233_Automating_Compositional—s. Recherchenbericht; 2016.

* cited by examiner

MARKOV CHAINS AND COMPONENT FAULT TREES FOR MODELLING TECHNICAL SYSTEMS

CROSS-REFERENCE TO RELATED APPLICATIONS

This application claims priority to PCT Application No. PCT/EP2016/079852, having a filing date of Dec. 6, 2016 and PCT Application No. PCT/EP2016/080134, having a filing date of Dec. 7, 2016 the entire contents which are hereby incorporated by reference.

FIELD OF TECHNOLOGY

The following relates to a method for modelling technical systems having a plurality of technical components.

BACKGROUND

The importance of safety-critical systems in many application domains of embedded systems, such as aerospace, railway, health care, automotive and industrial automation is continuously growing. Thus, along with the growing system complexity, also the need for safety assessment as well as its effort is increasing drastically to guarantee the high-quality demands in these application domains.

The goal of the safety assessment process is to identify all failures that cause hazardous situations and to demonstrate that their probabilities are sufficiently low. In the application domains of safety-critical systems the safety assurance process is defined by the means of safety standards.

Traditionally, the analysis of a system in terms of safety consists of bottom-up safety analysis approaches, such as Failure Mode and Effect Analysis (FMEA), and top-down approaches, such as Fault Tree Analysis (FTA) to identify failure modes, their causes, and effects with impact on the system safety.

With Component Fault Trees (CFTs) there is a model- and component-based methodology for FTA, which supports a modular and compositional safety analysis strategy. Fault tree elements are related to their development artifacts and can be reused along with the respective development artifact. However, with Fault Trees there is no possibility to express a temporal sequence of events. In contrast, to this Markov chains are a state-based analysis technique and enable safety and reliability analysis of complex systems with fault tolerance capabilities. However, the use of Markov chains is limited due to exponential explosion of the size of the model and the missing composability of Markov chains. To overcome these limitations and to combine the advantages of Component Fault Trees and Markov Chain a component concept for Markov chains is required. In this work, we present a component concept for Markov chains so that it is possible to build a safety artifact in form of a Markov Chain and to associate it to system development elements such as components. Hence, such Component Markov Chain elements can be reused along with the respective development artifact. Moreover, a modular and compositional safety analysis strategy is supported for Markov chains similar to Component Fault Trees. Thereby, so-called hybrid Fault Trees (hFTs) consisting of any combination of Component Fault Tree and Markov Chain elements can be build and analyzed.

Markov chains can be integrated in fault trees as a substitute of the Basic Events of fault trees. Thereby, a basic event is represented by a Markov chain. However, such an approach is limited to Markov chains with exactly one error state. Moreover, existing component concepts for Markov chains can only be associated to specific components, e.g. sensor components that do not get input from other components.

SUMMARY

An aspect relates to improving a reliability analysis and a safety assessment process of a plurality of technical components.

According to a first aspect this object is solved by a method for modelling technical systems having a plurality of technical components, comprising the step of assigning a component Markov chain to each component having a Markov chain for representing various states of the respective component; at least one input one failure mode for externally triggering a transition from one state of the Markov chain into another state of the Markov chain; and at least one output failure mode to each Markov chain for propagating failures to other components. In this way a safety analysis model can be realized for large-scale systems including a plurality of components using a divide-and-conquer strategy. Once set up, Markov chains can be reused along with the associated technical system component.

In a preferred technical embodiment of the method the Markov chain comprises an initial state and a set of error states of the component. This embodiment has the technical advantage that the component is represented by a healthy init state from which transitions into error states may occur.

In a further preferred technical embodiment of the method each transition from one state to another state is defined by a probability, which either represents a failure rate or a repair rate of the component. This embodiment has the technical advantage that failures and repairs of the component can be modelled efficiently.

In a further preferred technical embodiment of the method the component comprises an inport in logical connection with one or several input failure modes of the component Markov chain. This embodiment has the technical advantage that the component has an interface for input-coupling with other external components.

In a further preferred technical embodiment of the method the component comprises an outport in logical connection with one or several output failure modes of the component Markov chain. This embodiment has the technical advantage that the component has an interface for output-coupling with other external components.

In a further preferred technical embodiment of the method the outport of one component is logically connected with the inport of another component. This embodiment has the technical advantage that large scale systems including a plurality of components can be modelled efficiently.

In a further preferred technical embodiment of the method the component Markov chain is transformed into a component fault tree element for qualitative analysis. This embodiment has the technical advantage that the component Markov chain is simplified for achieving fast qualitative results.

In a further preferred technical embodiment of the method the probabilities to reach each error state, which triggers the output failure mode, by a sequence of states from the initial state of the Markov Chain are multiplied. This embodiment has the technical advantage that a quick transformation is achieved.

In a further preferred technical embodiment of the method a basic event is created, if a transition between two states has a fixed probability representing a failure rate. This embodiment has the technical advantage that the component Markov chain is transformed efficiently.

In a further preferred technical embodiment of the method else an OR-gate is created and all input failure modes, on which the transition depends, are connected to the OR-gate. This embodiment has also the technical advantage that the component Markov chain is transformed efficiently.

In a further preferred technical embodiment of the method for each output failure mode of the component Markov chain and for all different paths leading from the initial state of the component Markov chain to error states connected to an output failure mode, the basic events or OR-gates with connected input failure modes within the component fault tree element, which represent the transition, are connected by an AND-gate. This embodiment has also the technical advantage that the component Markov chain is transformed efficiently.

In a further preferred technical embodiment of the method the technical component comprises a hardware module or a software module. This embodiment has the technical advantage that various components can be analyzed.

According to a second aspect this object is solved by a component Markov chain for modelling technical systems, comprising a Markov chain for representing various states of the component; at least one input failure mode for externally triggering a transition from one state of the Markov chain into another state of the Markov chain; and at least one output failure mode for propagating failures to other components. The component Markov chain provides for the same technical advantages as the method according to the first aspect.

According to a third aspect this object is solved by a technical component comprising a storage module for storing a data structure representing a component Markov chain, comprising a Markov chain for representing various states of the component; at least one input failure mode for externally triggering a transition from one state of the Markov chain into another state of the Markov chain; and at least one output failure mode for propagating failures to other components. The technical component provides for the same technical advantages as the method according to the first aspect. In particular component Markov chains of technical components can be retrieved from the storage module when setting up technical systems. The storage module can be a non-volatile storage, like a ROM-Storage or a flash storage.

According to a fourth aspect this object is solved by a computer program loadable into a memory of a computer comprising software code portions for executing the method according to the first aspect, when the computer program is run on the computer. The computer may have a memory for digitally storing the computer program and a processor for processing the stored computer program. The computer program provides for the same technical advantages as the method according to the first aspect.

BRIEF DESCRIPTION

Figure 2:
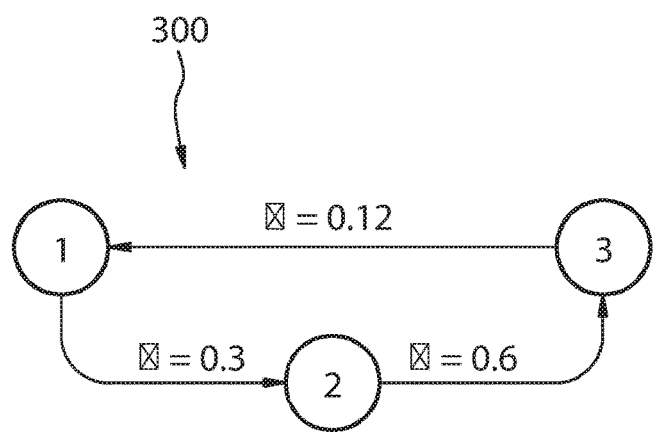
Figure 3:
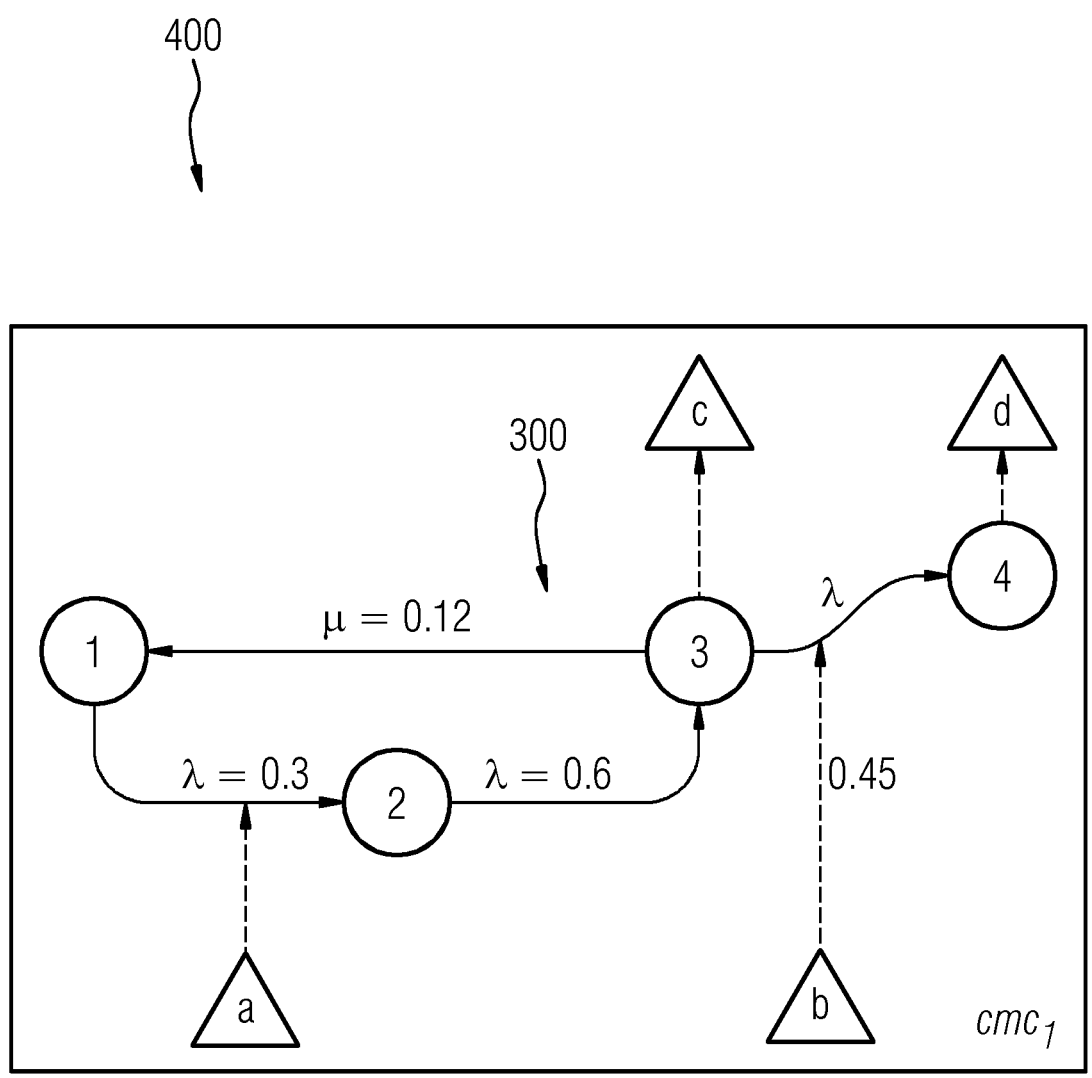
Figure 4:
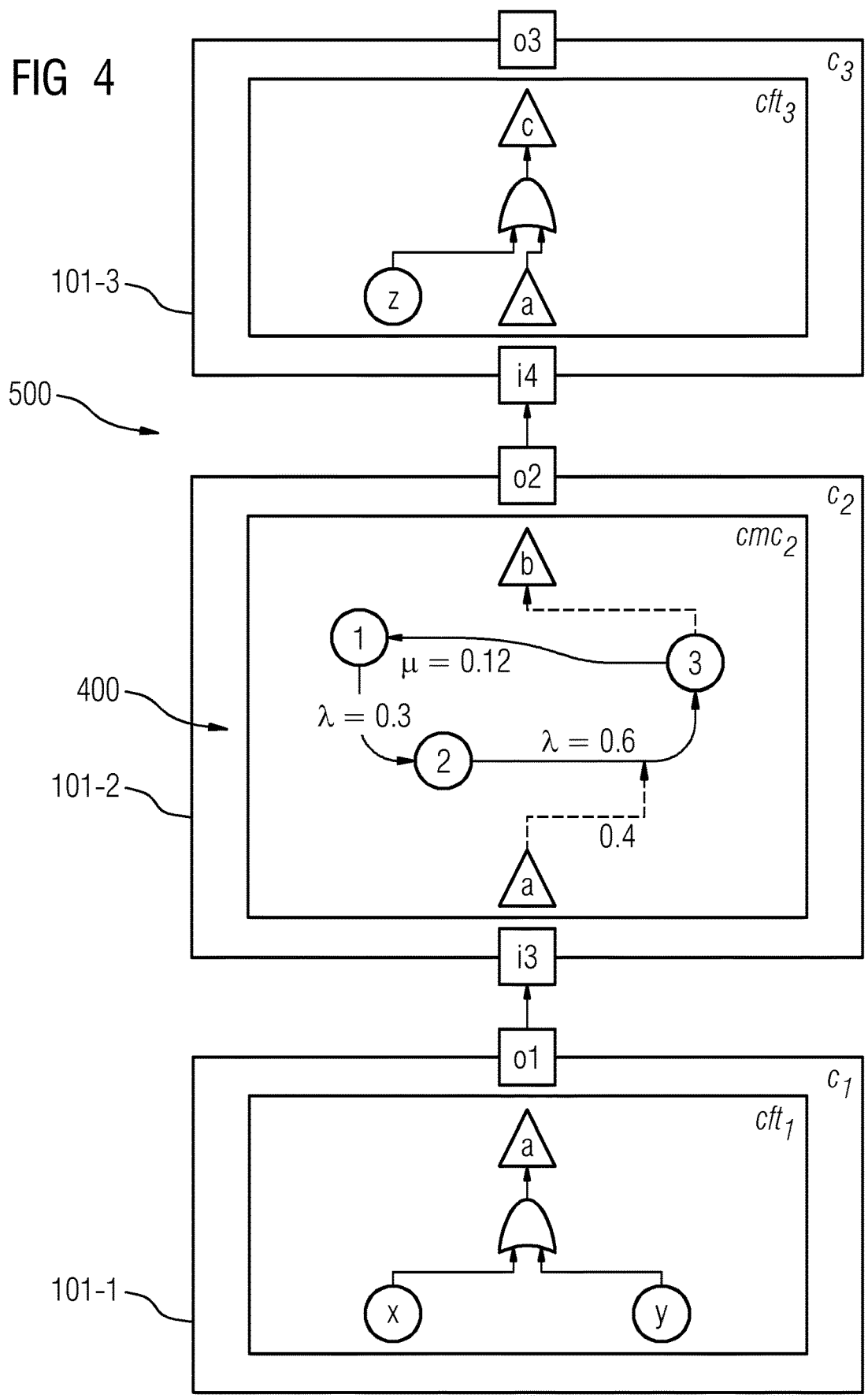
Figure 5:
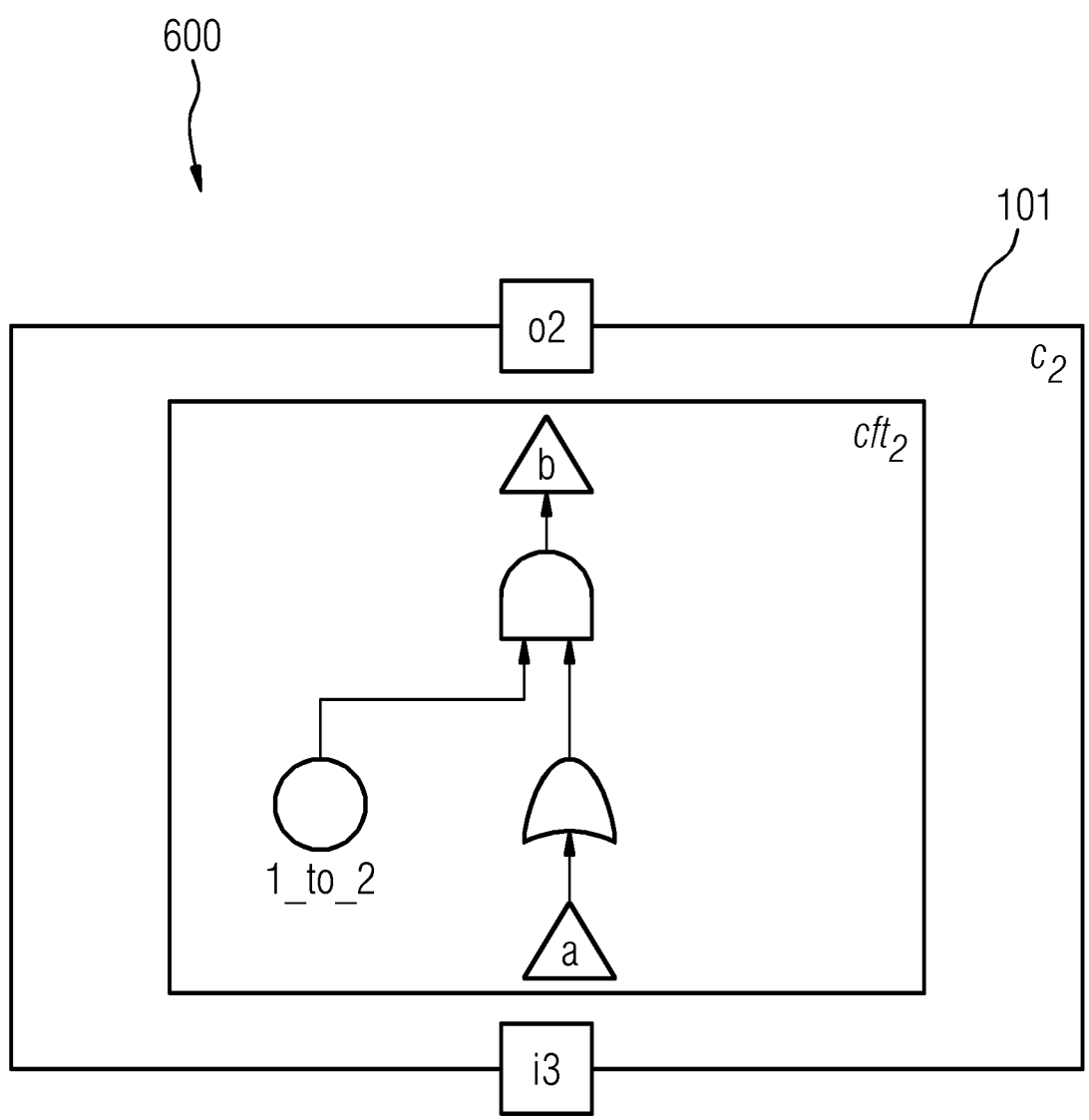

Some of the embodiments will be described in detail, with reference to the following figures, wherein like designations denote like members, wherein:

FIG. 1 shows a classic fault tree and component fault tree;
FIG. 2 shows an exemplary Markov chain;
FIG. 3 shows an exemplary component Markov chain;
FIG. 4 shows an exemplary hybrid fault tree; and
FIG. 5 shows an exemplary component Markov chain transformed into a CFT element for qualitative analysis.

DETAILED DESCRIPTION

FIG. 1 shows on the left side a classic fault tree 100 and on the right side a component fault tree 200. In both trees 100 and 200 the top events or output events TE1 and TE2 are modeled. The classic fault tree 100 and the component fault tree 200 comprise Boolean formulas represented by OR-Gates and AND-gates. Basic events A and In are processed into top events TE1 and TE2 by the Boolean formulas.

The model of the component fault tree 200 allows, additionally to the Boolean formulas that are also modeled within the classic fault tree 100, to associate the specific top events TE1 and TE2 to the corresponding output ports O1 of a component 101 where these failures can appear. Input to the component 101 is supplied via input port I1.

Top event TE1 for example appears at port O1. Using this methodology of components also within fault tree models, benefits during the development can be observed, for example an increased maintainability of the safety analysis model.

Markov chains (MC) are a top-down analysis technique. A Markov chain represents various system states and the relationships among them. Markov chains are often described by a sequence of directed graphs, in which the edges of the graph, i.e. the so-called transitions, are labeled with probabilities of going from one state at time n to another state at time n+1. In this way a so-called transition rate can be defined. The transition rate from one state to another is either a function of the failure or repair rate. Each state of a Markov chain is mutually exclusive because at any given time, the system can be in only one of the states. Especially, in fault tolerant systems the safety assessment process and evaluation of such system may be more appropriately achieved by the application of the Markov technique then using fault trees.

A component fault tree (CFT) 200 is a Boolean model associated to system development elements such as components 101. It has the same expressive power as classic fault trees 100. Like classic fault trees 100, also component fault trees 200 are used to model failure behavior of safety-critical systems. This failure behavior is used to document that a system is safe and can also be used to identify drawbacks of the design of a system. In component fault trees 200, a separate component fault tree element is related to a component 101. Failures that are visible at the outport of the component 101 are modeled using output failure modes which are related to the specific outport O1. To model how specific failures propagate from an inport I1 of a component 101 to the outport O1, input failure modes In are used. The internal failure behavior that also influences the output failure modes TE1 and TE2 is modeled using the Boolean gates such as "OR" and "AND" as well as basic events. Every component fault tree 200 can be transformed to a classic fault tree 100 by removing the input and output failure modes elements.

This can be combined into a general component concept for Markov chains. In the following, this method is described formally and illustrated using an example.

First, we assume that the System S consists of a set of components $C=\{c_1, \ldots, c_n\}$. Each component $c \in C$ includes a set of inports $IN(c)=\{in_1, \ldots, in_p\}$ and a set of outports $OUT(c)=\{out_1, \ldots, out_q\}$.

The information flow between the outport O1 of a component $c_i \in C$ and the inport of another component $c_j \in C$ (with $c_i \neq c_j$) is represented by a set of connections $$CON=\{(out_x,in_y)|out_x \in OUT(c_i), in_y \in IN(c_j)\}.$$

A Markov chain is a directed graph which consists of a set of states $S=\{S_i, \ldots, S_n\}$ with an initial state $s_{init} \in S$ to start from and a set of error states $S_{error} \subset S$. The relation between the states of the Markov chain is defined by a set of transitions:

$$T=\{(S_x,S_y)|S_x,S_y \in S\}.$$

Each transition $t_i \in T$ from state $s_j \in S$ to state $s_k \in S$ is defined by a probability $P(j,k)$, which either represents a failure rate $\lambda_{j,k}$ or a repair rate $\mu_{j,k}$:

$$P(j,k) = p_{j,k} = \begin{cases} \lambda_{j,k} = [0,1] \\ \mu_{j,k} = [0,1] \end{cases}$$

Hence, a Markov chain is defined by the tuple $$MC=(S,S_{error},s_{init},T)$$

FIG. 2 shows an example of a Markov chain 300 having an init state 1, intermediate state 2 and an error state 3. This exemplary Markov chain 300 is defined by:

$$S=\{1,2,3\}$$

$$S_{init}=1$$

$$S_{error}=\{3\}$$

$$T=\{(1,2),(2,3),(3,1)\}$$

$$P(1,2)=p_{1,2}=\lambda_{1,2}=0.3$$

$$P(2,3)=p_{2,3}=\lambda_{2,3}=0.6$$

$$P(3,1)=p_{3,1}=\mu_{3,1}=0.12$$

In order to specify a component Markov chain (CMC) $cmc_i$ which can be associated to any development artifact, like technical components 101 of the system $c_i \in C$, the definition of the Markov chain 300 is extended.

In addition the component Markov chain element $cmc_i$ may have a set of input failure modes $IFM=\{ifm_1, \ldots, ifm_q\}$ which represent incoming failures for outside of the scope of the component 101 with the failure rate $P(ifm_j)$. Each input failure mode $ifm_j \in IFM$ can trigger one or several transitions $T_{ifmj} \subseteq T$ of the component Markov chain. This relation is represented by a set of input failure mode dependencies:

$$DI=\{(ifm_x,t_y)|ifm_x \in IFM, t_y \in T\}$$

Each input failure mode dependency $di_{j,k} \in DI$ may define a factor $f(di_{j,k}) \to \mathbb{R}$ which scales the failure rate $P(ifm_j)$ of the input failure mode $ifm_j \in IFM$. The interconnection of a transition $t_k \in T$ with one or more input failure modes changes the probability of the transition $P(t_k)$ from state $s_a \in S$ to state $s_b \in S$:

$$P(a,b) = p_{a,b} + \sum_{l=1}^{q} f(di_{l,k}) * P(ifm_l)$$

Moreover, a component Markov chain may have a set of output failure modes $OFM=\{ofm_1, \ldots, ofm_r\}$ which represent failure propagated to other components with the failure rate $P(ofm_j)$. Each output failure mode $ofm_j \in OFM$ is triggered when a specific error state $s_k \in S_{error}$ is reached, since the error states of the component Markov chain represent the failures modes. This relation is represented by a set of output failure mode dependencies:

$$DO=\{(s_x,ofm_y)|s_x \in S, ofm_y \in OFM\}$$

If the error state $s_k$ is reached, the output failure mode $ofm_j$ is triggered. Thus, $P(s_k)=P(ofm_j)$.

Hence, a component Markov chain is defined by the tuple $$CMC=(S,S_{error},s_{init},T,IFM,DI,OFM,DO)$$

FIG. 3 shows an example for a component Markov chain 400. This exemplary component Markov Chain 400 is defined by:

$$S=\{1,2,3,4\}$$

$$s_{init}=1$$

$$S_{error}=\{3,4\}$$

$$T=\{(1,2),(2,3),(3,1),(3,4)\}$$

$$IFM=\{a,b\}$$

$$DI=\{(a,t_1),(b,t_4)\}$$

$$OFM=\{c,d\}$$

$$DO=\{(3,c),(4,d)\}$$

with $$f(a,t_1)=0.0$$

$$f(b,t_4)=0.45$$

Hence, the probabilities for the transition rates of the exemplary component Markov chains 400 are as follows:

$$P(1,2)=\lambda_{1,2}+f(a,t_1)*P(a)=0.3$$

$$P(2,3)=\lambda_{2,3}=0.6$$

$$P(3,1)=\mu_{3,1}=0.12$$

$$P(3,4)=\lambda_{3,1}+f(b,t_4)*P(b)=0.0+0.45*P(b)$$

A component Markov chain $cmc_i$ can be associated to a technical system component $c_i \in C$ in the same way a CFT element is associated with a component 101:

$$CMC(c_i)=cmc_i \text{ with } cmc_i \neq \emptyset$$

Thereby, it is possible that the input and output failure modes of a component Markov chain $cmc_i$ can be mapped onto the input and output ports of the component $c_i$. Based on the above definition a component Markov chain 400 can be analyzed qualitatively or quantitatively.

FIG. 4 shows an exemplary hybrid Fault Tree (hFT) 500 to illustrate the analysis of the component Markov chain 400 having the components 101-1, 101-2 and 101-3. The following exemplary hybrid fault tree 500 is defined by:

$$C=\{c_1,c_2,c_3\}$$

$$IN(c_1)=\{\}$$

$$IN(c_2)=\{i1\}$$

$$IN(c_3)=\{i2\}$$

$$OUT(c_1)=\{o1\}$$

OUT($c_2$)={o2}

OUT($c_3$)={o3}

CON={(o1,i1),(o2,i2)}

$\tilde{\text{CFT}}$($c_1$)=$cft_1$ $\tilde{\text{CMC}}$($c_2$)=$cmc_2$ $\tilde{\text{CFT}}$($c_3$)=$cft_3$ For qualitative analysis the component Markov chain 400 is transformed into a component fault tree element. This transformation is performed in two steps:
1. If a transition between two states has a fixed probability, i.e. there is no input failure mode dependency between an input failure mode and the transition, and this probability represents a failure rate $\lambda$ and a repair rate $\mu$, then a basic event is created. Otherwise, an OR-gate is created and all input failure modes, on which the transition depends, are connected to this gate.
2. For each output failure mode of the component Markov chain 400 and for all different paths leading from the initial state of the component Markov chain 400 to error states connected to an output failure mode, the basic events or OR-gates with connected input failure modes within the CFT element, which represent the transition, are connected by an AND-gate. If more than one path is existing, all AND-gates are connected by an OR-gate, which is then connected to the output failure mode.

FIG. 5 shows an exemplary component Markov chain 400 transformed into a CFT element 600 for qualitative analysis. For the exemplary hybrid Fault Tree 500 as depicted in FIG. 4, the component Markov chain $cmc_2$ for the qualitative analysis is transformed into a CFT as follows.

In a quantitative analysis the failure probability P($ofm_j$) of each output failure mode $ofm_j \in$ OFM of a component Markov chain $cmc_i$ is defined as $$\sum_{do_{k,j} \in DO} P(s_k) = \sum_{do_{k,j} \in DO} \prod_{l=1}^{n} P(s_{k+l-1}, s_{k+l})$$

Thereby, the probabilities to reach the error state, which triggers the output failure mode $ofm_j$, is calculated by summing up the probabilities of each sequence of states from the initial state of the Markov Chain to this error state. The probability of a sequence of transitions is defined the product of all transition rates $P(s_{k+l-1}, s_{k+l})$.

Since the failure rate of each output failure mode of a component Markov chain 400 can be calculated as described above, the component Markov chain 400 can be combined with CFT elements in any way and integrated into the hybrid fault tree. For the exemplary hybrid fault tree as depicted in FIG. 4 the following failure rates for the basic events are assumed:

$P(x) = 2.0 * 10^{-7}$ $P(y) = 4.0 * 10^{-7}$ $P(z) = 1.0 * 10^{-7}$

Thus, the failure rate of the input failure mode a is $P(a) = 6.0 * 10^{-7}$.

Hence, the quantitative analysis of the component Markov chain $cmc_2$ results in:

$$P(b) = P(3) = P(1,2) * P(2,3)$$
$$= 0.3 * (0.6 + (0.4 * P(a)))$$
$$= 0.3 * (0.6 + (0.4 * 6.0 * 10^{-7}))$$
$$= 0.18$$

The component concept for Markov chains allows the modular specification of a Markov chain and the association to a system development element such as a technical component.

The technical component can be a software module, like an object in object oriented programming (OOP). The technical component can also be hardware module, like an electronic circuit or an application-specific integrated circuit (ASIC). The technical component can also comprise combinations of hardware and software.

Since the approach enables the composition of component Markov chain, large-scale systems including a plurality of components can be modeled using a divide-and-conquer strategy and Markov chains can be reused along with the associated technical system component.

Thus, the complexity of building Markov models for complex technical systems is reduced. Moreover, component Markov chain models can be combined with Component Fault Tree (CFT) models in any way in order to build a hybrid fault trees which can then be analyzed qualitatively, e.g. by a minimal cut set analysis or quantitatively.

All features discussed or shown with respect to particular embodiments can be provided in various combinations in order to simultaneously realize their advantageous effects.

All method steps can be implemented by corresponding means which are adapted for performing the respective method step. All functions provided by particular means can be a method step of the method.

The scope of protection is given by the claims and not restricted by features discussed in the description or shown in the figures.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A storage module for storing a data structure representing a component Markov chain, comprising:
    a Markov chain for representing various states of a technical component;
    at least one input failure mode representing incoming failures for outside a scope of the technical component for externally triggering a transition from one state of the Markov chain into another state of the Markov chain; and
    at least one output failure mode for propagating failures to other technical components;
    wherein the component Markov chain is transformed into a component fault tree element for qualitative analysis,
    wherein probabilities to reach each error state, which triggers the output failure mode, by a sequence of states from the initial state of the Markov chain are multiplied, wherein if a transition between two states has a fixed probability representing a failure rate, then a basic event is created, wherein if a transition between two states does not have a fixed probability then a OR-gate is created and all input failure modes, on which the transition depends, are connected to the OR-gate, wherein for each output failure mode of the component Markov chain and for all different paths leading from the initial state of the component Markov chain to error states connected to an output failure mode, the basic events or OR-gates with connected input failure modes within the component fault tree element, which represent the transition, are connected by an AND-gate, and wherein if more than one failure mode path exists in the component Markov Chain, all AND-gates within the component fault tree of the different failure mode paths are connected by a second OR-gate.

2. The storage module according to claim 1, wherein the Markov chain comprises an initial state and a set of error states of the component.

3. The storage module according to claim 2, wherein each transition from one state to another state is defined by a probability, which either represents a failure rate or a repair rate of the component.

4. The storage module according to claim 1, wherein the component comprises an inport in logical connection with one or several input failure modes of the component Markov chain.

5. The storage module according to claim 1, wherein the component comprises an outport in logical connection with one or several output failure modes of the component Markov chain.

6. The storage module according to claim 1, wherein an outport of one component is logically connected with an inport of another component.

7. A computer program product, comprising a non-transitory computer readable memory storing software code portions for executing a method for modelling technical systems having a plurality of technical components when the computer program is run on a processor, the method comprising:

assigning a component Markov chain to each technical component of the plurality of technical components having:
a Markov chain for representing various states of the respective component;
at least one input failure mode representing incoming failures for outside a scope of the respective technical component for externally triggering a transition from one state of the Markov chain into another state of the Markov chain; and
at least one output failure mode to each Markov chain for propagating failures to other components transforming the component Markov chain into a component fault tree element for qualitative analysis, multiplying probabilities to reach each error state, which triggers the output failure mode, by a sequence of states from the initial state of the Markov chain, creating a basic event if a transition between two states has a fixed probability representing a failure rate, creating an OR-gate if a transition between two states does not have a fixed probability and connecting all input failure modes, on which the transition depends, to the OR-gate, connecting, using an AND-gate, for each output failure mode of the component Markov chain and for all different paths leading from the initial state of the component Markov chain to error states connected to an output failure mode, the basic events or OR-gates with connected input failure modes within the component fault tree element, which represent the transition, and connecting, using a second OR-gate, if more than one failure mode path exists in the component Markov chain, all AND-gates within the component fault tree of the different failure mode paths.

8. The computer program product according to claim 7, wherein the Markov chain comprises an initial state and a set of error states of the component.

9. The computer program product according to claim 8, wherein each transition from one state to another state is defined by a probability, which either represents a failure rate or a repair rate of the component.

10. The computer program product according to claim 7, wherein the component comprises an inport in logical connection with one or several input failure modes of the component Markov chain.

11. The computer program product according to claim 7, wherein the component comprises an outport in logical connection with one or several output failure modes of the component Markov chain.

12. The computer program product according to claim 7, wherein an outport of one component is logically connected with an inport of another component.

13. A computer-implemented method for modelling and analyzing a complex safety-critical technical system having a plurality of technical components, wherein the plurality of technical components include a hardware module and a software module, comprising:

providing a processor;
assigning, by the processor, a component Markov chain to each technical component of the plurality of technical components having:
a Markov chain for representing various states of the respective component;
at least one input failure mode representing incoming failures for outside a scope of the respective technical component for externally triggering a transition from one state of the Markov chain into another state of the Markov chain; and
at least one output failure mode to each Markov chain for propagating failures to other components;
transforming, by the processor, the component Markov chain into a component fault tree element for qualitative analysis,
multiplying, by the processor, probabilities to reach each error state, which triggers the output failure mode, by a sequence of states from the initial state of the Markov chain,
creating, by the processor, a basic event, if a transition between two states has a fixed probability representing a failure rate,
creating, by the processor, a first OR-gate, if a transition between two states does not have a fixed probability and connecting, by the processor, all input failure modes, on which the transition depends, to the first OR-gate,
connecting, by the processor, using an AND-gate, for each output failure mode of the component Markov chain and for all different paths leading from the initial state of the component Markov chain to error states connected to an output failure mode, the basic events or OR-gates with connected input failure modes within the component fault tree element, which represent the transition, and connecting, by the processor, using a second OR-gate, if more than one failure mode path exists in the component Markov chain, all AND-gates within the component fault tree of the different failure mode paths; and performing, by the processor, an analysis of the complex safety-critical technical system using the component fault tree element transformed from the component Markov chain.

14. The method according to claim 13, wherein the Markov chain comprises an initial state and a set of error states of the component.

15. The method according to claim 14, wherein each transition from one state to another state is defined by a probability, which either represents a failure rate or a repair rate of the component.

16. The method according to claim 13, wherein the component comprises an inport in logical connection with one or several input failure modes of the component Markov chain.

17. The method according to claim 13, wherein the component comprises an outport in logical connection with one or several output failure modes of the component Markov chain.

18. The method according to claim 13, wherein an outport of one component is logically connected with an inport of another component.

\* \* \* \* \*